United States Patent
Nolden et al.

(10) Patent No.: US 11,091,194 B2
(45) Date of Patent: Aug. 17, 2021

(54) OPERATING MOTOR VEHICLE ELECTRICALLY ASSISTED STEERING

(71) Applicant: Ford Global Technologies, LLC, Dearborn, MI (US)

(72) Inventors: Simon Nolden, Cologne (DE); Jens Dornhege, Pulheim (DE); Stephan Klein, Cologne (DE); Goetz-Philipp Wegner, Dortmund (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 353 days.

(21) Appl. No.: 16/250,358

(22) Filed: Jan. 17, 2019

(65) Prior Publication Data
US 2019/0241210 A1 Aug. 8, 2019

(30) Foreign Application Priority Data
Feb. 2, 2018 (DE) .......................... 102018201609.7

(51) Int. Cl.
| | | |
|---|---|---|
| *B62D 5/04* | (2006.01) | |
| *B62D 6/10* | (2006.01) | |
| *B62D 15/02* | (2006.01) | |
| *B62D 1/28* | (2006.01) | |
| *B62D 6/02* | (2006.01) | |

(52) U.S. Cl.
CPC ........... *B62D 5/0463* (2013.01); *B62D 1/286* (2013.01); *B62D 5/0481* (2013.01); *B62D 6/02* (2013.01); *B62D 6/10* (2013.01); *B62D 15/024* (2013.01)

(58) Field of Classification Search
CPC .... B62D 5/0463; B62D 1/286; B62D 5/0481; B62D 6/02; B62D 6/10; B62D 15/024
See application file for complete search history.

(56) References Cited

U.S. PATENT DOCUMENTS

| | | | | |
|---|---|---|---|---|
| 6,250,419 B1* | 6/2001 | Chabaan | ............... | B62D 5/0463 180/443 |
| 6,895,318 B1* | 5/2005 | Barton | .................. | B60T 8/1755 180/204 |
| 7,185,731 B2* | 3/2007 | Farrelly | .................... | B62D 6/04 180/412 |

(Continued)

FOREIGN PATENT DOCUMENTS

| | | |
|---|---|---|
| DE | 102009000868 B4 | 12/2011 |
| DE | 102014201107 B4 | 2/2016 |

(Continued)

OTHER PUBLICATIONS

"Driver assistance systems", Audi Media Center, Feb. 17, 2017, https://www.audi-mediacenter.com/en/technology-lexicon-7180/driver-assistance-systems-7184.

*Primary Examiner* — Minnah L Seoh
*Assistant Examiner* — Michael R Stabley
(74) *Attorney, Agent, or Firm* — Frank A. MacKenzie; Bejin Bieneman PLC

(57) ABSTRACT

A motor vehicle has an electrically assisted steering system. A steering angle velocity of the motor vehicle, and a driver manual torque change applied by a driver of the motor vehicle are determined. At least the steering angle velocity and the driver manual torque change are analyzed to determine whether the driver manual torque change and the steering angle velocity are not correlated. An error signal is output if the driver manual torque change and the steering angle velocity are not correlated.

20 Claims, 4 Drawing Sheets

(56) References Cited

U.S. PATENT DOCUMENTS

| | | |
|---|---|---|
| 8,978,814 B2 | 3/2015 | Iijima et al. |
| 2012/0101685 A1 | 4/2012 | Engels et al. |
| 2013/0226411 A1* | 8/2013 | Hirano .................... B62D 6/00 |
| | | 701/42 |
| 2016/0052543 A1 | 2/2016 | Weinreich et al. |
| 2016/0107644 A1 | 4/2016 | Eigel |
| 2017/0101131 A1 | 4/2017 | Zegelaar et al. |
| 2017/0355396 A1* | 12/2017 | Varunjikar ............. B62D 5/049 |

FOREIGN PATENT DOCUMENTS

| | | |
|---|---|---|
| DE | 102014216574 A1 | 2/2016 |
| DE | 102016008791 A1 | 2/2017 |
| EP | 1726513 A1 | 11/2006 |

* cited by examiner

OPERATING MOTOR VEHICLE ELECTRICALLY ASSISTED STEERING

CROSS-REFERENCE TO RELATED APPLICATION

This patent application claims priority to German Application No. DE 102018201609.7 filed on Feb. 2, 2018, which is hereby incorporated by reference in its entirety.

BACKGROUND

Modern motor vehicles, for example, passenger automobiles, have a number of driver assistance systems. Driver assistance systems (e.g., Advanced Driver Assistance Systems or ADAS) are understood in this context as electronic auxiliary devices in motor vehicles for assisting the driver in certain driving situations. Safety aspects, but also increasing the driving comfort, are often in the foreground here. Such driver assistance systems engage partially autonomously or autonomously in the drive (for example, gas, brake), control (for example, parking steering assistant), or signaling devices of the motor vehicle.

An electrically assisted steering system is an electrical power steering system, which generally operates when the driver applies a steering torque. An essential advantage of the electric drive of the electrically assisted steering system is that the steering can be adaptively designed and can also be supported by driver assistance systems. The steering system can also be used as an actuator for more extensive driver assistance tasks (for example, automatic steering interventions in the case of ESP II, parking and lane keeping assistant, etc.).

In operation, the electrically assisted steering system assists the driver when steering by measuring the torque applied by the driver and amplifying it by way of the actuator, for example, a motor such as a servomotor. This motor, which is used as an example of all possible forms of assistance, ensures enhanced comfort, on the one hand, and is used to implement additional functions, for example, those of a lane keeping assistant, on the other hand. The torque request of the motor has direct influence on the steering behavior of the motor vehicle and thus on the driver, however. This normal assistance of the electrical steering system can also be understood in a broader meaning as a driver assistance function. The present description is thus also applicable to the assistance of driver steering torques.

Since the driver assistance systems are dependent on sensor data and a correct implementation, errors cannot be entirely prevented. For safety reasons, the torque request to the motor therefore may be limited. For example, each function can be limited individually, or all functions are limited in aggregate.

However, these approaches can also negatively influence the "normal function" or "good function" of the driver assistance systems, by incorrectly limiting the torque in situations in which no error is present at all and therefore limiting is not necessary. The driving situation is incorrectly estimated in these cases by the limiting function.

Known limiting functions limit the amplitude and/or the rate of the steering torque requested by the driver assistance system to small values. However, this can greatly restrict the authority of these driver assistance systems. DE 10 2014 201 107 A1 discloses a method in which the present steering angle velocity is compared to a range permissible on the driver manual torque, to prevent unintended driver assistance requests. However, high steering angle velocities can especially also be applied by energies previously introduced into the system. Restoring forces by tires, especially in the case of rising vehicle velocities and dynamic maneuvers, thus results in high steering angle velocities in the direction of the steering wheel middle position with low driver manual torque at the same time. The known approaches register an infringement of the permitted conditions in this case or have to be parameterized such that infringement is no longer recognized for these special maneuvers; however, this can have the result that the actual safety function is no longer ensured in a sufficient form.

SUMMARY

The present disclosure relates to a method for operating a motor vehicle having an electrically assisted steering system. Furthermore, the present disclosure includes a computer program product and a control unit for carrying out such a method, an electrically assisted steering system having such a control unit, and a motor vehicle having such an electrically assisted steering system.

A method for operating a motor vehicle having an electrically assisted steering system, comprises the following steps:
  determining a steering angle velocity of the motor vehicle,
  determining a driver manual torque change applied by a driver of the motor vehicle,
  analyzing at least the steering angle velocity and the driver manual torque change to determine whether the driver manual torque change and the steering angle velocity are not correlated, and
  outputting an error signal if the driver manual torque change and the steering angle velocity are not correlated.

It is presumed that every desired significant vehicle reaction is initiated by the driver.

Various measures can be taken upon the error signal. For example, the permitted absolute steering torque amplitude for a driver assistance function can be reduced in the direction of zero if the error signal is set. However, other measures can also be taken to maintain the effect of the safety function. Furthermore, the permitted absolute steering torque amplitude for the driver assistance function can be elevated up to a velocity-dependent maximum value when the error signal is no longer present. Furthermore, the steering torque requested by a driver assistance function can be limited to a permitted steering torque amplitude.

The method described here has the advantage that the limiting is established above all on the steering command of the driver. It is not necessary to prepare and classify possible scenarios beforehand for steering angle velocities in relation to the driver manual torque. It is solely directed as to whether the driver wishes to steer in a different direction than the present steering wheel movement. The number of incorrect infringement detections during rapid steering movements, which are initiated by the driver or result from the restoring forces of the tires, is thus significantly reduced. The possible functional availability rises significantly and driver assistance systems can operate more efficiently. In addition, the calibration is simplified by a reduced number of parameters in comparison to the method described in DE 10 2014 201 107 A1, which results in a cost saving.

In parallel, the safety is not reduced in case of error due to the driver command detection. The inactivity detection can simultaneously ensure that in moments of inattentiveness of the driver, the maximum permissible steering angle velocity initiated by driver assistance system is reduced to an amount such that sufficient reaction time is provided to the driver in case of error.

Finally, a correlation test of the driver manual torque change and the steering angle velocity is executed. The driver manual torque change and the steering angle velocity can thus be linked to together and analyzed in a particularly simple manner.

According to one embodiment, to determine whether the driver manual torque change and the steering angle velocity are not correlated, a direction of the driver manual torque change and a direction of the steering angle velocity are determined and compared, and a conclusion is made of a non-correlated driver manual torque change and steering angle velocity if the direction of the driver manual torque change and the direction of the steering angle velocity are unequal. For example, a direction of the driver manual torque change in a first direction can be represented by a value of a variable 1 and in a second direction opposite to the first direction by a value −1 of the variable, while a direction of the steering angle velocity in a first direction is represented by a value of a variable 1 and in a second direction opposite to the first direction by a value −1 of the variable. It can thus be established by simple logical links of the determined respective directions whether the driver manual torque change and the steering angle velocity are correlated or not. If they point in different directions, an error signal is set.

According to a further embodiment, to determine a driver manual torque change applied by a driver of the motor vehicle, only driver manual torque change values of the driver manual torque change are used which are greater than a threshold value. Deadband can thus be formed in a simple manner, by which it is ensured that defined amplitudes of the driver manual torque change values symmetrically around 0 remain unconsidered and cannot corrupt the further analysis.

According to a further embodiment, a value representative of a driver activity of the driver is registered and the threshold value for the deadband for the driver manual torque change is modified if the value representative of the driver activity of the driver is less than a limiting value. An inactive driver, i.e., a driver who is not actively steering and/or a steering wheel which is released, can thus be taken into consideration in a particularly simple manner.

According to a further embodiment, only steering angle velocity values of the steering angle velocity which are greater than a threshold value are used to determine a steering angle velocity of the motor vehicle. Deadband can thus be formed in a simple manner, by which it is ensured that defined amplitudes of the steering angle velocity values symmetrically around 0 remain unconsidered and cannot corrupt the further analysis.

According to a further embodiment, a value representative of a activity of the driver is registered and the threshold value for the deadband for the steering angle velocity is modified if the value representative of the driver activity of the driver is less than a limiting value. An inactive driver, i.e., a driver who is not steering and/or a steering wheel which is released, can thus be taken into consideration in a particularly simple manner.

According to a further embodiment, upon the presence of the error signal, a permitted limit for the steering torque requested by the driver assistance function is reduced. In case of error, the steering intervention is thus reduced and the safety is therefore enhanced. According to a further embodiment, the reduction of the maximum limit of the steering torque requested by the driver assistance function takes place according to a predetermined function. For example, ramp functions having various formations can be used, for example, constant, rising linearly with time, rising with the square of time, or formed as a function of the vehicle dynamics. Furthermore, the ramp function can be formed by a low-pass-filtered jump function from the maximum available torque or instantaneous limit to a target value.

According to a further embodiment, if the error signal is not set, the permitted limit for the steering torque requested by the driver assistance function is elevated up to a maximum value according to a predetermined function. For example, ramp functions having various formations can also be used here, for example, constant, rising linearly with time, rising with the square of time, or formed as a function of the vehicle dynamics. Furthermore, the ramp function can be formed by a low-pass-filtered jump function from the maximum available torque or instantaneous limit to a target value.

According to a further embodiment, the maximum value for the permitted limit is represented by a value settable for the vehicle. In one advantageous embodiment, this value can assume various values depending on the vehicle velocity.

According to a further embodiment, a value representative of a driver activity of the driver is registered and an error is determined if the value representative of a driver activity of the driver is less than a threshold value and the steering angle velocity of the motor vehicle is greater than the limiting value. The cases can thus also particularly be taken into consideration in which the driver is not attentive and at least does not actively apply a turning or steering torque to the steering wheel. In other words, the cases are considered to be errors in which sudden steering locks occur without steering wheel actuation on the part of the driver.

Further disclosed is a computer program product and a control unit for carrying out such a method, an electrically assisted steering system having such a control unit, and a motor vehicle having such an electrically assisted steering system.

SUMMARY OF THE DRAWINGS

The invention will now be explained on the basis of a drawing. In the figures.

DESCRIPTION

Figure 1:
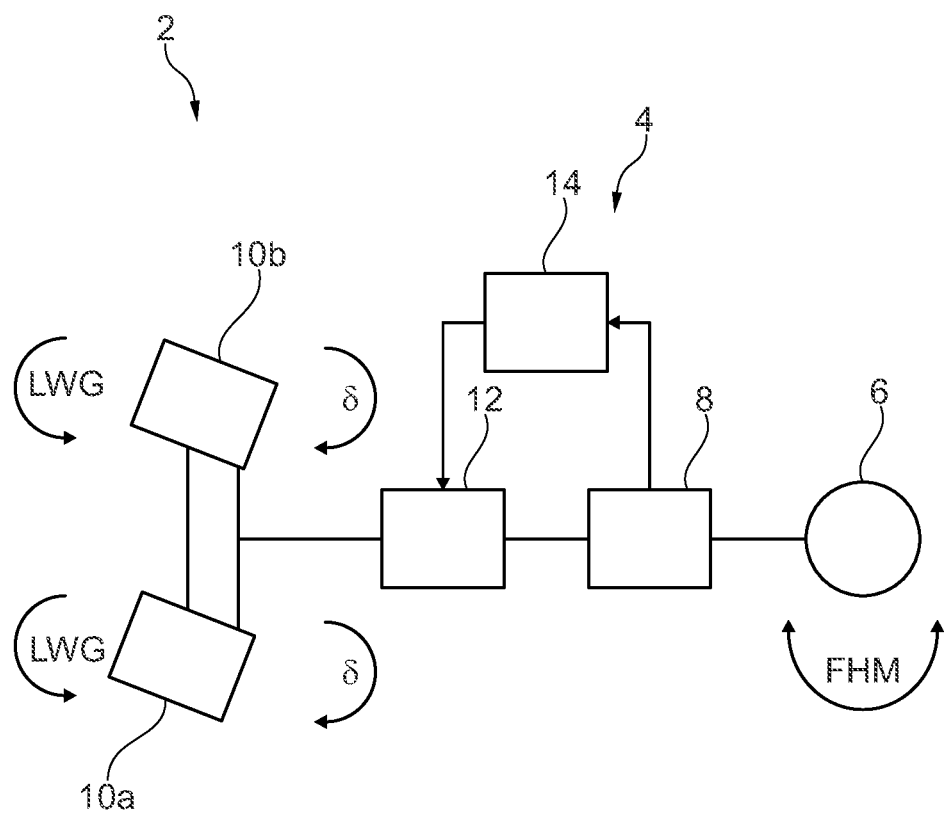
FIG. 1 shows a schematic illustration of an electrically assisted steering system for a motor vehicle.

Reference is first made to FIG. 1.

An electrically assisted steering system 4 of a motor vehicle 2, for example, of a passenger automobile, is shown having the wheels 10a, 10b of the motor vehicle 2, in the present exemplary embodiment a steerable right and left front wheel, to which a steering angle 6 can be applied. The electrically assisted steering system 4 is an electrical power steering system, which is active when steering movements take place.

In the present exemplary embodiment, the electrically assisted steering system 4 has a steering torque sensor 8, an electric motor 12, and a control unit 14.

The electric motor 12, in the present exemplary embodiment a program-controlled electric positioning motor, assists and overlays the steering torques of the driver, who introduces them by rotating the steering wheel 6.

A driver manual torque FHM can be registered using the steering torque sensor 8. The driver manual torque FHM is a torque which is manually applied by a driver of the motor vehicle 2 and engages on the steering wheel 6.

The control unit 14 is designed in the present exemplary embodiment for the purpose of determining an torque assist setpoint dimension while analyzing a driver torque actual dimension and providing a positioning torque for actuating the electric motor 12 from the torque assist setpoint dimension. Furthermore, the control unit 14 provides functionality to apply steering torque requests of at least one driver assistance function or compute them from incoming signals and change the actuation of the electric motor 12 accordingly.

The electrically assisted steering system 4 can be designed, for example, as an EPS or EPAS system (EPS=Electric Power Steering, EPAS=Electric Power Assisted Steering), in which the electric motor 12 assists and overlays the steering torques of the driver.

During travel of the motor vehicle 2, high steering angle velocities can also be applied by energies previously introduced into the system. Thus, restoring forces due to the tires 10a, 10b, especially in the case of rising vehicle velocities and dynamic maneuvers, result in high steering angle velocities LWG in the direction of the steering wheel middle position with low driver manual torque FHM at the same time.

This can be interpreted as an error by the control unit 14, with the consequence that safety functions are deactivated and are thus not available.

In order to avoid such errors of the above-mentioned conditions, the control unit 14 is designed in the present exemplary embodiment for the purpose of determining the steering angle velocity LWG of the motor vehicle 2 and the driver manual torque change FMA applied by a driver of the motor vehicle 2, which corresponds to the derivative of the driver manual torque FHM. The control unit 14 can have hardware and/or software components for carrying out these tasks, which are described hereafter.

In order to set an error signal FS in case of error, the control unit 14 checks whether the driver manual torque change FMA and the steering angle velocity LWG are correlated or not correlated with respect to direction.

It is presumed for this purpose that every significant vehicle reaction is initiated by the driver.

The control unit 14 is designed for the purpose of determining and comparing a direction of the driver manual torque change FMA and a direction of the steering angle velocity LWG. A non-correlated driver manual torque change FMA and steering angle velocity LWG is determined if the direction of the driver manual torque change FMA and the direction of the steering angle velocity LWG are unequal.

If a first direction is assigned the logical value 1 and a second direction opposite to the first direction is assigned the logical value −1, the steering angle change, i.e., the sign of the steering angle velocity LWG, correlates to the rate of change of the driver manual torque FHM, i.e., the driver manual torque change FMA, if the direction thereof has the same logical value. If the steering angle or the driver manual torque does not change, i.e., steering angle velocity or driver manual torque change are equal to 0, the respective direction is also assigned the logical value 0.

An error exists if the following applies:

$$\mathrm{sgn}(d\delta/dt)*\mathrm{sgn}(dFHM/dt)=-1.$$

To enhance the degree of robustness and to preclude errors, the control unit 14 is designed in the present exemplary embodiment for the purpose of filtering both the steering angle velocity LWG and also the driver manual torque FHM, for example, using a first-order low-pass filter.

To further enhance the degree of robustness, the control unit 14 is designed for the purpose of using deadband. Deadband lying symmetrically around zero for the driver manual torque FHM and the steering wheel velocity LWG are thus precluded from the further analysis.

Thus, for example, only rates of change of the driver manual torque FHM and the steering angle velocity LWG above a settable or fixed threshold value can be taken into consideration.

For this purpose, the control unit 14 is designed in the present exemplary embodiment to use only driver manual torque change values to determine a driver manual torque change FMA applied by a driver of the motor vehicle 2 and to use only steering angle velocity values to determine the steering angle velocity LWG of the motor vehicle 2 which are greater than a respective threshold value, to thus exclude predetermined value ranges from the evaluation.

Furthermore, the control unit 14 in the present exemplary embodiment has a function for inactivity detection of the driver. With the function for inactivity detection of the driver, it is registered whether the driver has no longer performed significant steering interventions within a specific, predetermined period of time or the manual torque introduced by the driver into the system is below a specific, predetermined limiting value for a specific time.

The control unit 14 is furthermore designed in an alternative exemplary embodiment to determine an error if the driver has been detected as inactive (FIA=1) and the steering angle velocity LWG has exceeded a predetermined limiting value GW. This limiting value GW can be determined as a function of the velocity or other vehicle-state-dependent variables of the motor vehicle 2.

$$FIA=1\&d\delta/dt>GW\text{->}FS=1$$

The function for inactivity detection of the driver can be designed for the purpose of analyzing a curve of the driver manual torque FHM within a specific settable period of time to determine inactivity of the driver.

If the control unit 14 registers an error, the control unit 14 thereupon reduces the presently available torque of the driver assistance function (present limit) proceeding from a defined maximum value (maximum limit) with each execution step using, for example, a defined ramp function in the direction of zero. The maximum available torque (maximum limit) can primarily be determined in this case by the velocity v and possibly by further variables for describing the vehicle state of the motor vehicle 2. Notwithstanding the present exemplary embodiment, however, other measures can also be carried out upon the presence of the case of error.

Ramp functions having various forms can be used, for example, constant, rising linearly with time, rising with the square of time, or formed as a function of the vehicle dynamics. Furthermore, the ramp function can be formed by a low-pass-filtered jump function from the maximum available torque or instantaneous limit to a target value.

Furthermore, the starting value of the ramp function can be advanced from the available torque or maximum limit to the presently requested torque. In one advantageous embodiment, the smallest value in absolute value of present limit and requested torque is used as the starting value of the ramp function.

In contrast, if an error does not exist and if the present limit is below the maximum limit, a return rate is determined, at which the present limit is returned up to the maximum limit via a ramp function. The same methods as in the case of error can be applied for the determination of the return rate.

Finally, the control unit 14 is designed for the purpose of limiting the requested torque of a driver assistance function symmetrically to the presently computed limit.

A method sequence of the operation of the electrically assisted steering system 4 illustrated in FIG. 1 according to a first exemplary embodiment will now be explained with additional reference to FIG. 2.

In a first step S1000, the method is started. The method start can take place cyclically at a predetermined, fixed, or settable sampling rate.

In a further step S1010, measured values are input by the control unit 14. Furthermore, measured values representative of items of information on the vehicle status, for example, its velocity v, longitudinal and transverse acceleration, and/or yaw rate, and also steering-internal measured values, for example, the steering angle δ, a steering velocity, and/or the driver manual torque FHM can be input. In the present exemplary embodiment, the control unit 14 inputs measured values representative of the velocity v of the motor vehicle 2, the steering angle velocity LWG, and the driver manual torque FHM.

In a further step S1020, it is checked whether the driver manual torque change FMA is present. If the derivative of the driver manual torque FHM, i.e., the driver manual torque change FMA, is not input by the control unit 14, steps S1030 and S1040 are executed in order to determine the driver manual torque change FMA after filtering of the driver manual torque FHM using a first-order low-pass filter in step S1030 and by, for example, numerical differentiation in step S1040. Otherwise, the method is continued with a step S1050.

In the present exemplary embodiment, a further signal postprocessing using further filters is provided in further step S1050. If a corresponding signal quality is present, however, this step can also be omitted.

Furthermore, a determination of the activity of the driver takes place in a further step S1060 in the present exemplary embodiment. For this purpose, the provided measured values, in particular the driver manual torque FHM and/or the driver manual torque change FMA are analyzed to determine whether the driver actively influences the vehicle actions or whether he is relatively inactive.

The function for the inactivity detection of the driver supplies a signal FIA logical 1 for an inactive driver and a signal FIA logical 0 for an active driver. In a further advantageous embodiment of the method, the signal FIA can also assume values between 0 and 1 to ensure a fluid transition of the parameters selected for the following steps.

In a further step S1070, the parameters for the following checks are selected in particular using the signal FIA.

In a further step S1080, ranges of the measured values, for example, measured values of the driver manual torque change FMA and the steering angle velocity LWG are excluded from the further analysis. For this purpose, dead regions are used in the present exemplary embodiment to exclude regions symmetrically around zero.

In a further step S1090, the respective directions of the driver manual torque change FMA and the steering angle velocity LWG are determined and the respective signs are assigned to them as already described.

In a further step S1100, the assigned signs are analyzed, i.e., it is checked whether the signs or directions are equal or unequal.

If the check in step S1100 has the result that the signs or directions are different, the criterion is infringed or met and in a further step S1110, an error signal, for example, in the form of an error flag FS, is set to the value logical 1. In contrast, if the criterion is not infringed or met, in a step S1120, the error signal, for example, in the form of an error flag FS, is set to the value logical 0.

In a further step S1130, a transition takes place to a method for error handling, which will be explained later with reference to FIG. 4.

Notwithstanding the present exemplary embodiment, the sequence of steps S1000 to S1130 can also be different. For example, individual steps, groups of steps, or values can be exchanged. Furthermore, it can also be provided that individual or multiple steps are executed at the same time, i.e., simultaneously.

A further method sequence of the operation of the electrically assisted steering system 4 illustrated in FIG. 1 will now be explained according to a second exemplary embodiment with additional reference to FIG. 3.

Steps S2000 to S2060 and steps S2080 to S2130 correspond to steps S1000 to S1060 and S1080 to S1130 of the method sequence according to the first exemplary embodiment.

In other words, the method according to the second exemplary embodiment differs from the method according to the first exemplary embodiment due to step S2070 and further steps S2140 to S2160.

In further step S2070, it is checked whether the driver is active or inactive. If it has been established that the driver is active (FIA=0), the method is continued with the steps already explained in FIG. 2. Otherwise (FIA=1), the method is continued with step S2140.

If the driver is inactive (FIA=1), in step S2140, a check of the steering angle velocity LWG is initiated.

In further step S2150, the steering angle velocity LWG is compared to the limiting value GW, i.e., it is checked whether the steering angle velocity LWG is above the limiting value GW.

If the absolute steering angle velocity LWG is below the limiting value GW, in a further step S2160, the error signal, for example in the form of an error flag FS, is set to the value logical 0, otherwise, in step S2110, the error signal, for example in the form of an error flag, is set to the value logical 1.

In a further step S2130, a transition takes place to a method for error handling, which will be explained later with reference to FIG. 4.

Notwithstanding the present exemplary embodiment, the sequence of steps S2000 to S2160 can also be different. For example, individual steps, groups of steps, or values can be exchanged. Furthermore, it can also be provided that individual or multiple steps are executed at the same time, i.e., simultaneously.

Figure 4:
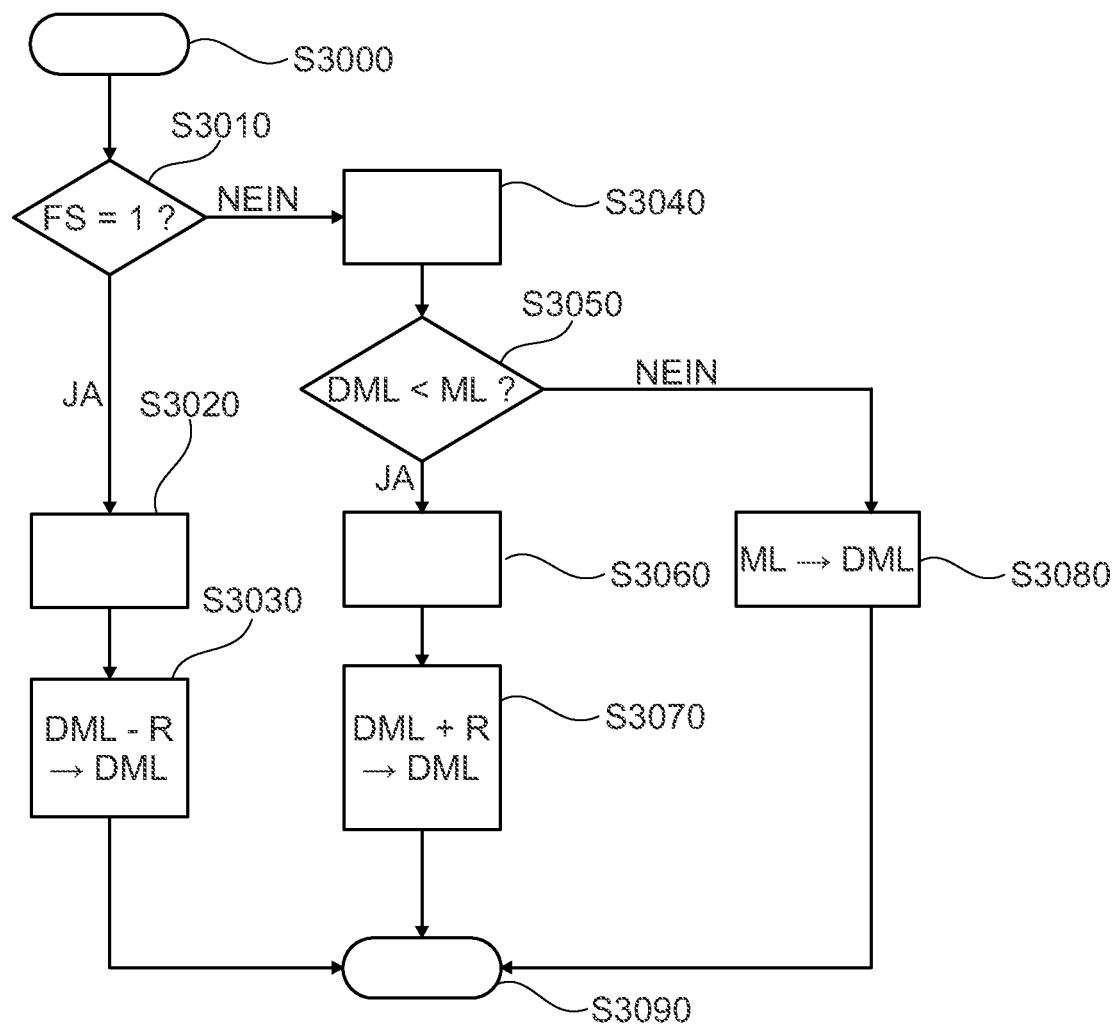
FIG. 4 shows a schematic illustration of further steps of the method sequence shown in FIGS. 2 and 3 for further error handling.

Reference will now be made to FIG. 4.

In a first step S3000, the method is started. The method start can take place cyclically with a predetermined, fixed or settable sampling rate. However, the method is typically executed after every call of the method according to FIG. 2 or FIG. 3.

In a further step S3010, it is checked whether an error is present, i.e., it is checked whether the error signal FS is set to the value logical 1. If an error is present, the method is continued with steps S3020 and S3030. Otherwise, the method is continued with step S3040 and the following steps.

If an error is present, it is determined in further step S3020 at which rate R or linear slope a torque authority is to sink according to a ramp function. The rate R can have a constant value, or the rate R can be determined as a function of the time since the error is present, velocity v of the motor vehicle 2, the steering angle velocity LWG, a driver manual torque rate, a yaw rate, a transverse acceleration, or a combination of these values.

In further step S3030, a present torque limit DML is reduced with the parameters for a ramp function defined in step S3020, i.e., the rate R, proceeding from the present torque limit DML.

In contrast, if no error is present, in a further step S3040, a maximum limit ML is determined as a function of the velocity v of the motor vehicle 2. Possible further measured values on the vehicle status can be taken into consideration.

In a further step S3050, it is checked whether the present torque limit DML is below the previously determined maximum limit LM. If this is the case, the method is continued with a step S3060, otherwise the method is continued with a step S3080.

In step S3060, the rate R is determined with which the return is to be made to the maximum value. The rate R can have a constant value, or the rate can be determined as a function of the time since the error is no longer present, the velocity v of the motor vehicle 2, the steering angle velocity LWG, a driver torque rate, a yaw rate, a transverse acceleration, or a combination of these values.

In a further step S3070, the value of the torque limit DML is elevated proceeding from the present torque limit using the parameters for a ramp function defined in step S3080, i.e., the rate R, but never higher than the maximum limit ML.

In contrast, if the present torque limit DML is greater than or equal to the maximum limit LM, in a further step S3080, the present torque limit DML is set to the value of the maximum limit LM. The method ends in the case of all described branches with step S3090.

Notwithstanding the present exemplary embodiment, the sequence of steps S3000 to S3090 can also be different. For example, individual steps or groups of steps can be exchanged. Furthermore, it can also be provided that individual or multiple steps are executed at the same time, i.e., simultaneously.

In a further step (not shown here), the steering torque requested by the driver assistance function is limited in absolute value to the present torque limit DML, but not modified in its direction or its sign.

The method described here has the advantage that the limiting is established above all on the steering command of the driver. It is not necessary to prepare and classify possible scenarios for steering angle velocities in relation to the driver manual torque FHM beforehand. It is merely noted whether the driver wishes to steer in a different direction than the present steering wheel movement. A rate of infringement errors during rapid steering movements which are initiated by the driver is thus significantly reduced. The possible functional availability therefore rises significantly and driver assistance systems can operate more efficiently. In addition, the calibration is simplified by a reduced number of parameters, which results in a cost saving.

At the same time, the safety in case of error is not reduced by the driver command detection. The inactivity detection can ensure at the same time that at moments of inattentiveness of the driver, the maximum permissible steering angle velocity LWG is reduced to an amount which provides the driver with sufficient reaction time in case of error.

Figure 2:
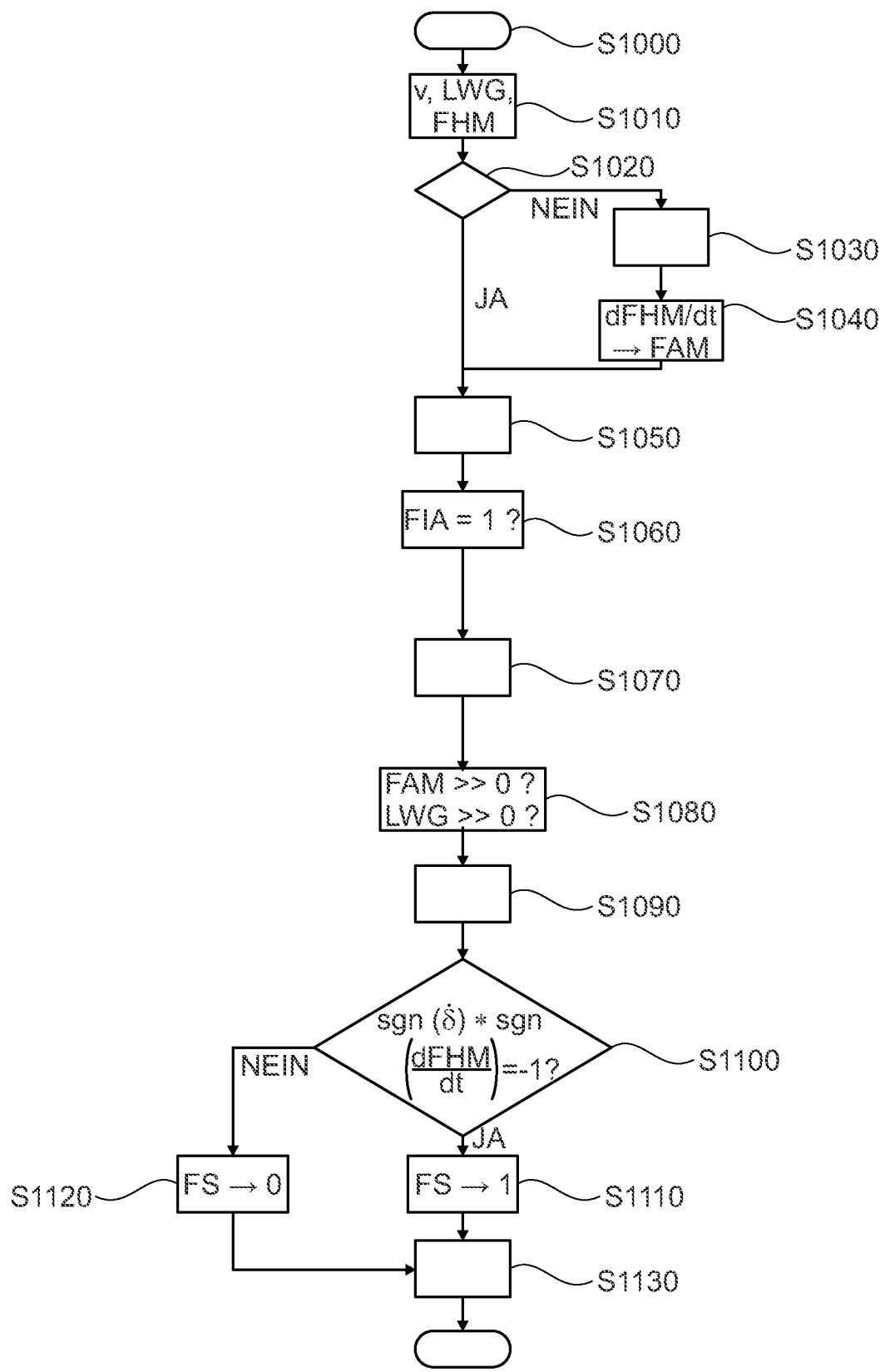
FIG. 2 shows a schematic illustration of a method sequence of an operation of the electrically assisted steering system shown in FIG. 1 according to a first exemplary embodiment.
Figure 3:
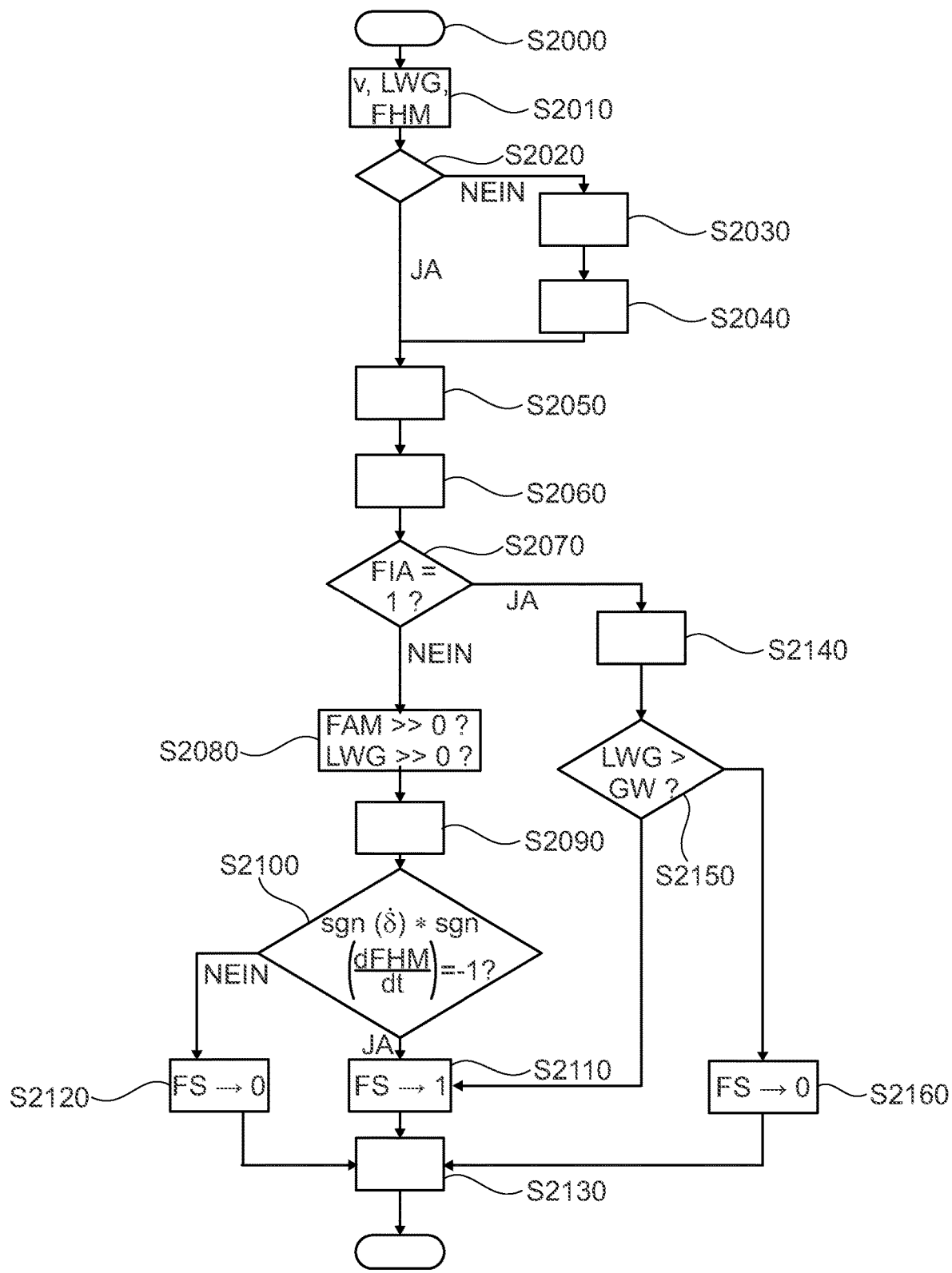
FIG. 3 shows a schematic illustration of a method sequence of an operation of the electrically assisted steering system shown in FIG. 1 according to a second exemplary embodiment.

In a further advantageous embodiment of the method according to FIG. 2 and FIG. 3, it is additionally checked in steps S1100 and S2100 whether the steering torque requested by the driver assistance function points in the same direction as the preprocessed steering angle velocity signal and the error signal is only set, for example, in the form of an error flag FS to the value logical 1 in these cases.

LIST OF REFERENCE SIGNS 2 motor vehicle
4 electrically assisted steering system
6 steering wheel
8 steering torque sensor
10a wheel
10b wheel
12 electric motor
14 control unit
δ steering angle
DML present torque limit
FIA driver inactivity flag
FS error signal
FHM driver manual torque
FMA driver manual torque change
GW limiting value
LWG steering angle velocity
ML maximum limit
R rate
v velocity
S1000-S1130 step
S2000-S2160 step
S3000-S3090 step

The invention claimed is:

1. A method for operating a motor vehicle having an electrically assisted steering system, comprising:
   determining a steering angle velocity of the motor vehicle;
   determining a driver manual torque change applied by a driver of the motor vehicle,
   analyzing at least the steering angle velocity and the driver manual torque change to determine whether the driver manual torque change and the steering angle velocity are not correlated by determining and comparing a direction of the driver manual torque change and a direction of the steering angle velocity, and determining a non-correlated driver manual torque change and steering angle velocity when the direction of the driver manual torque change and the direction of the steering angle velocity are unequal; and
   outputting an error signal when the driver manual torque change and the steering angle velocity are not correlated;
   wherein only driver manual torque change values of the driver manual torque change which are greater than a threshold value are used to determine a driver manual torque change applied by a driver of the motor vehicle.

2. The method of claim 1, wherein a value representative of a driver activity is detected and the threshold value is changed if the value representative of the driver activity is less than a limiting value.

3. The method of claim 1, wherein only steering angle velocity values of the steering angle velocity which are greater than a threshold value are used to determine a steering angle velocity of the motor vehicle.

4. The method of claim 3, wherein a value representative of a driver activity is registered and the second threshold value is modified if the value representative of the driver activity is less than a limiting value.

5. The method of claim 1, wherein the steering torque requested by a driver assistance function is reduced to a torque limit upon the presence of the error signal.

6. The method of claim 5, wherein, when the error signal is not set, the permitted limit for the steering torque requested by the driver assistance function is raised up to a maximum value according to a predetermined function.

7. The method of claim 6, wherein the maximum value for the permitted limit is represented by a value settable for the motor vehicle.

8. The method of claim 5, wherein the torque limit for the steering torque requested by a driver assistance function is raised according to a predetermined function.

9. The method of claim 1, wherein a value representative of a driver activity is registered and an error is determined if the value representative of the driver activity is less than a threshold value and the steering angle velocity of the motor vehicle is greater than a limiting value.

10. A control unit storing programming to:
  determine a steering angle velocity of the motor vehicle;
  determine a driver manual torque change applied by a driver of the motor vehicle;
  analyze at least the steering angle velocity and the driver manual torque change to determine whether the driver manual torque change and the steering angle velocity are not correlated by determining and comparing a direction of the driver manual torque change and a direction of the steering angle velocity, and determining a non-correlated driver manual torque change and steering angle velocity when the direction of the driver manual torque change and the direction of the steering angle velocity are unequal; and
  output an error signal when the driver manual torque change and the steering angle velocity are not correlated;
  wherein only driver manual torque change values of the driver manual torque change which are greater than a threshold value are used to determine a driver manual torque change applied by a driver of the motor vehicle.

11. The control unit of claim 10, further comprising programming wherein a value representative of a driver activity is detected and the threshold value is changed if the value representative of the driver activity is less than a limiting value.

12. The control unit of claim 10, further comprising programming wherein only steering angle velocity values of the steering angle velocity which are greater than a threshold value are used to determine a steering angle velocity of the motor vehicle.

13. The method of claim 12, further comprising programming wherein a value representative of a driver activity is registered and the second threshold value is modified if the value representative of the driver activity is less than a limiting value.

14. The control unit of claim 10, further comprising programming wherein the steering torque requested by a driver assistance function is reduced to a torque limit upon the presence of the error signal.

15. The control unit of claim 14, further comprising programming wherein, when the error signal is not set, the permitted limit for the steering torque requested by the driver assistance function is raised up to a maximum value according to a predetermined function.

16. The control unit of claim 15, further comprising programming wherein the maximum value for the permitted limit is represented by a value settable for the motor vehicle.

17. The control unit of claim 14, further comprising programming wherein the torque limit for the steering torque requested by a driver assistance function is raised according to a predetermined function.

18. The control unit of claim 10, further comprising programming wherein a value representative of a driver activity is registered and an error is determined if the value representative of the driver activity is less than a threshold value and the steering angle velocity of the motor vehicle is greater than a limiting value.

19. A control unit storing programming to:
  determine a steering angle velocity of the motor vehicle;
  determine a driver manual torque change applied by a driver of the motor vehicle;
  analyze at least the steering angle velocity and the driver manual torque change to determine whether the driver manual torque change and the steering angle velocity are not correlated by determining and comparing a direction of the driver manual torque change and a direction of the steering angle velocity, and determining a non-correlated driver manual torque change and steering angle velocity when the direction of the driver manual torque change and the direction of the steering angle velocity are unequal; and
  output an error signal when the driver manual torque change and the steering angle velocity are not correlated;
  wherein only steering angle velocity values of the steering angle velocity which are greater than a threshold value are used to determine a steering angle velocity of the motor vehicle.

20. The control unit of claim 19, wherein only driver manual torque change values of the driver manual torque change which are greater than a threshold value are used to determine a driver manual torque change applied by a driver of the motor vehicle.

* * * * *